United States Patent [19]

Hahn

[11] Patent Number: 5,433,380
[45] Date of Patent: Jul. 18, 1995

[54] SELF-CLEANSING PRESSURE WASHING SYSTEM FOR CHEMICAL SPRAYER

[75] Inventor: Kent S. Hahn, Evansville, Ind.

[73] Assignee: Hahn, Inc., Evansville, Ind.

[21] Appl. No.: 190,425

[22] Filed: Feb. 2, 1994

[51] Int. Cl.$^6$ .......................... B05B 7/32; B05B 9/08; B05B 15/02

[52] U.S. Cl. .................... 239/62; 239/104; 239/157; 239/159; 239/113; 134/169 R

[58] Field of Search ............... 239/112, 113, 61, 62, 239/146, 155–157, 159, 172, 104, 106; 134/169 R

[56] References Cited

U.S. PATENT DOCUMENTS

| | | | |
|---|---|---|---|
| 4,196,852 | 4/1980 | Thomas, III | 239/113 |
| 4,723,709 | 2/1988 | Curran, Jr. et al. | 239/112 |
| 4,938,242 | 7/1990 | Redmond | 239/104 |
| 5,016,817 | 5/1991 | Ghate et al. | 239/113 |
| 5,125,576 | 6/1992 | Ziegenbein | 239/113 |

OTHER PUBLICATIONS

One-page leaflet entitled "Tank Rinsing System," Chemial Containers, Inc., Lake Wales, Fla., date unknown.
One-page document entitled "Plumbing Injection Module", date unknown.
One-page leaflet entitled "MID-TECH FCI 4000," Midwest Technologies, Inc., Springfield, Ill., date unknown.
Leaflet entitled "Injector Pro Chemical Injection Applicator," The Toro Company, Minneapolis, Minn., Copyright 1993.
Brochure entitled "Multi Pro 1100 and Multi Pro 5200," The Toro Company, Minneapolis, Minn., copyright 1992.
Brochure entitled "Quiet Powerful Precise Maxi-Pro 440," Hahn Turf Products, Evansville, Ind., date unknown.
Brochure entitled "Smooth Stable Precise Multi-Pro 418," Hahn Turf Products, Evansville, Ind., date unknown.

Primary Examiner—Karen B. Merritt

[57] ABSTRACT

An injection type chemical sprayer (30) including interior and exterior cleaning systems. The interior cleaning system can include a rinsing nozzle (58) located within the concentrated chemical tank (52). Rinsing nozzle (58) can be selectively connected to the pressure side of a spray pump (34). The chemical rinsate can be dispensed by means of a rinsate pump (64) in combination with a rinsate nozzle (66). Following the rinsing operation, the concentrated chemical tank (52) can be reconnected to an injection pump (56), and then the concentrated chemical tank (52) can be filled with clean water which is then pumped through the injection system to completely flush it of the chemical being injected. System (30) also preferably includes an exterior cleaning system which can include a spray gun (60) selectively connected to the pressure side of the spray pump (34).

20 Claims, 5 Drawing Sheets

SELF-CLEANSING PRESSURE WASHING SYSTEM FOR CHEMICAL SPRAYER

FIELD OF THE INVENTION

This invention generally relates to injection type chemical sprayers. More particularly, it relates to an injection sprayer for turf which includes a self-cleansing pressure washing system.

BACKGROUND OF THE INVENTION

Commercial chemical sprayers for turf are well known. Such systems can be used for applying fertilizers and pesticides to a golf course, for example. The term "pesticide" will be used broadly herein to refer to any chemical, natural or man-made, which is intended to control or eliminate an unwanted plant, animal or insect, and would include but not be limited to herbicides, insecticides, fungicides and nematicides. While the present invention is not limited to commercial pesticide sprayers for turf, it will be described in that context for the sake of brevity.

Figure 1:
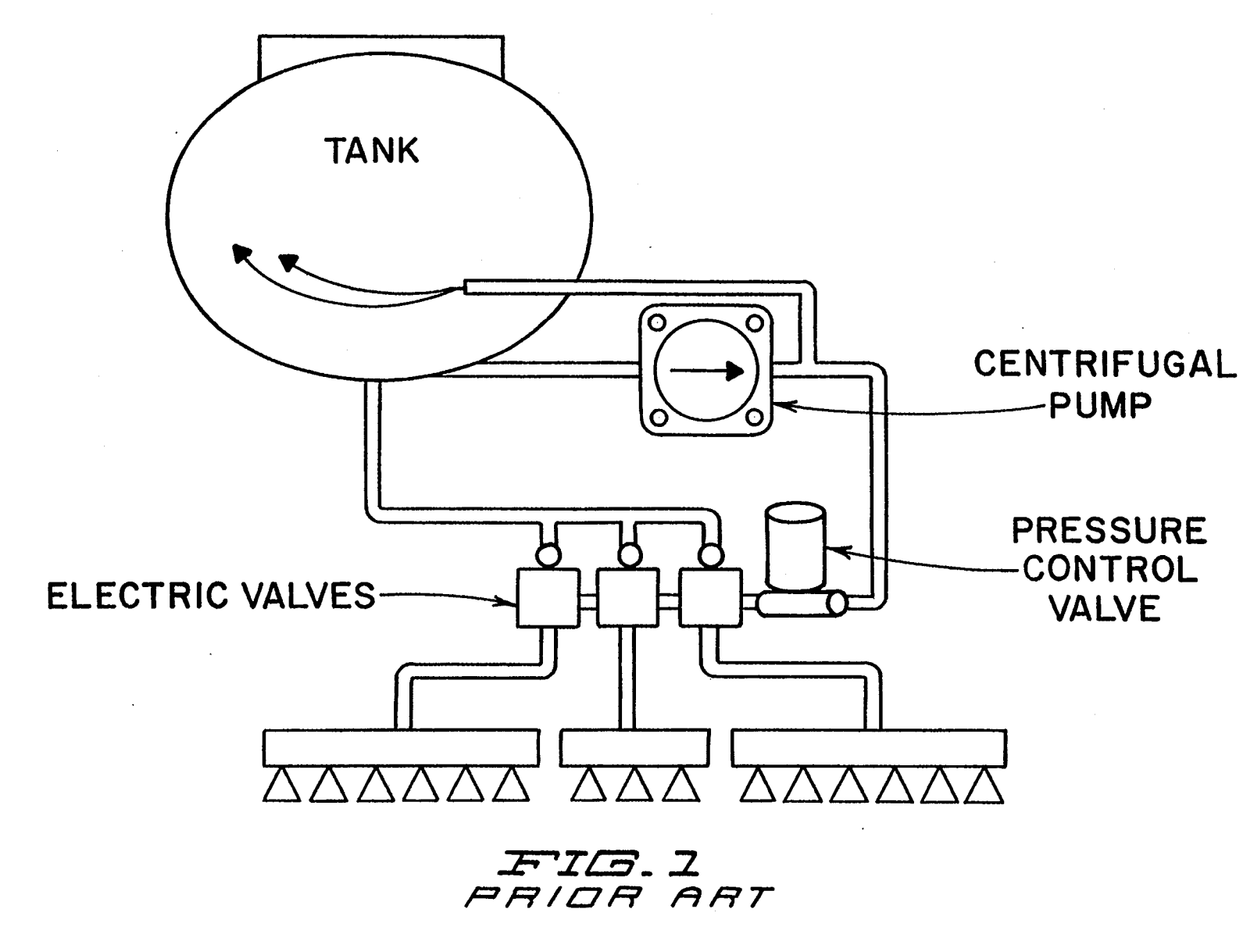
FIG. 1 is a schematic of a first prior art spray system.

FIG. 1 shows a schematic of a typical prior art turf sprayer. It includes a large tank for containing the chemical solution (made by mixing water and concentrated chemical). The chemical could be a pesticide, and this discussion will focus on same. Connected to the tank is a centrifugal pump, the outlet of which is connected to a pressure control valve, which in turn feeds a plurality of electric-solenoid operated on/off valves. Some of the liquid on the pressure side (i.e., the outlet) of the centrifugal pump is also returned to the tank to help mix the pesticide solution to keep it homogeneous. The outlet of each on/off valve is connected to a manifold carrying a plurality of spray nozzles which actually deliver the pesticide solution to the turf. There is also a return line running from the valves back to the main tank, so that when a valve is turned off, instead of the pressure increasing in the other lines, the solution is returned to the tank and the pressure at the other booms remains constant. Typically, the components of such a spray system are "off the shelf" and are plumbed together using standard hoses and fittings. One example of the spray system described above is the Multi Pro® dedicated spray vehicle sold by The Toro Company and manufactured by Hahn, Inc., the assignee of the present invention.

One advantage of the turf sprayer illustrated in FIG. 1 is that it has a relatively small number of off-the-shelf components and is relatively easy to construct and maintain. One disadvantage of the type of sprayer shown in FIG. 1 is that it doesn't automatically compensate for changes in the speed of the vehicle carrying the spray components. Thus, when the vehicle moves faster the system delivers relatively less pesticide solution per unit area. Another, and probably more significant problem, relates to the difficulty in properly disposing of the contents of the tank, after the spraying operation. The typical tank has a capacity of about 100 gallons, and if the operator ends the day with, say, 20 gallons of pesticide solution remaining, the operator has to store or dispose of a rather large volume of solution which is closely regulated by the U.S. Environmental Protection Agency (EPA). EPA regulations for most pesticides do not allow overnight storage of the pesticide solution in the spray tank, and proper disposal is extremely cumbersome. According to EPA regulations, leftover pesticide solution must be evenly dispensed over a previously untreated area or stored in the original concentrate container. It cannot simply be washed down the drain or dumped behind the maintenance shed. And the "leftover problem" arises not only at the end of the work day, but also when the operator wants to switch from one pesticide to another.

Figure 2:
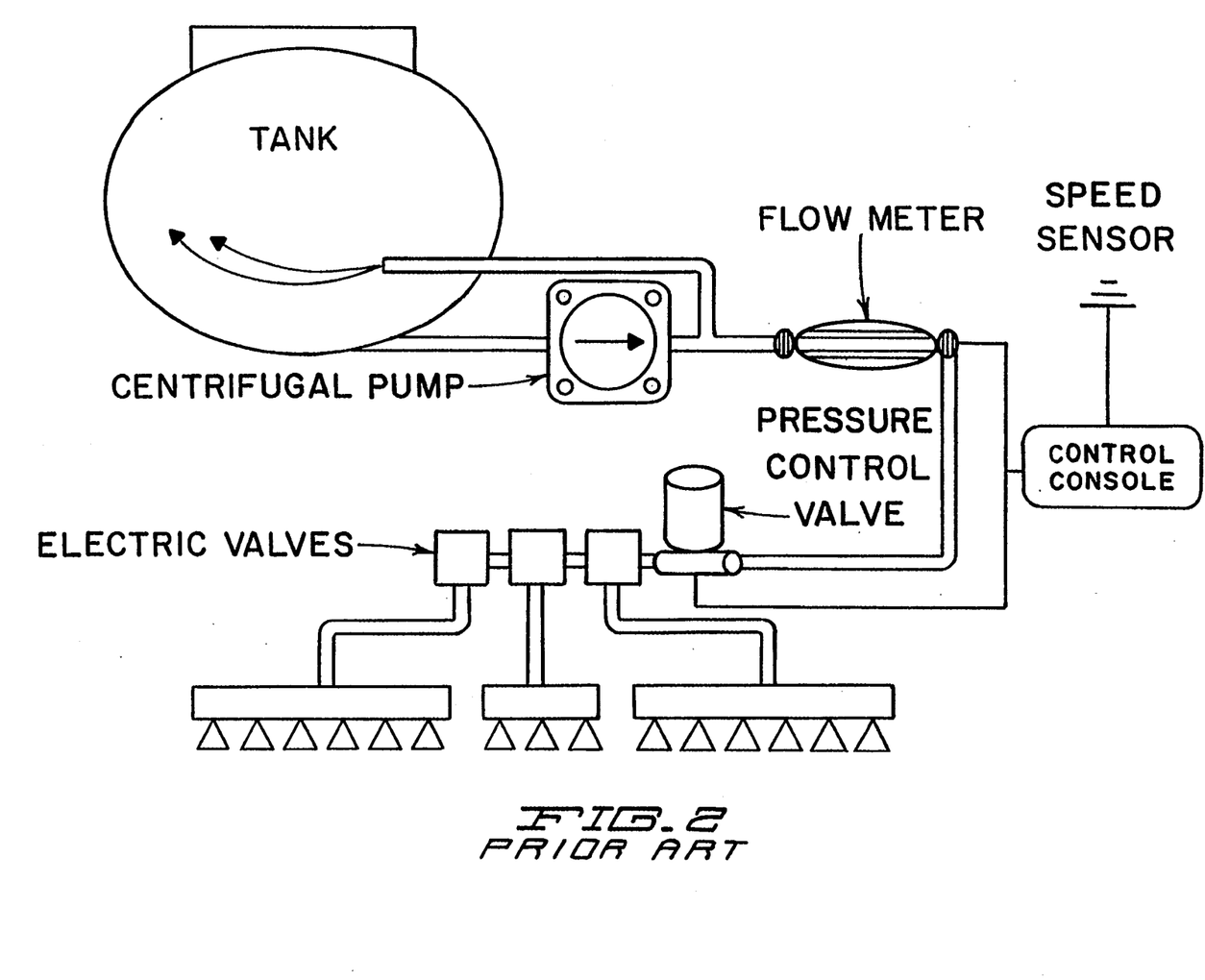
FIG. 2 is a schematic of a second prior art spray system.

A more sophisticated spray system is schematically shown in FIG. 2. This type of system, also represented in the prior art, includes all of the components of the system shown in FIG. 1, but also includes means for compensating for varying vehicle speeds, so that the delivery rate of the solution per unit area remains more or less fixed. Specifically, the improved system shown in FIG. 2 includes a flow meter, pressure control valve and vehicle speed sensor connected to a controller. When the vehicle speeds up, the controller proportionally opens the pressure control valve to allow a larger flow of pesticide solution; and when the vehicle slows down, the controller proportionally closes the pressure control valve to allow a smaller flow of pesticide solution. The flow meter measures the flow to the boom and with this information the controller tells the control valve to open or close to achieve the target rate. Information at the controller is tabulated on gallons left in the tank and gallons applied to the turf via the flow meter.

While the more sophisticated system of FIG. 2 addresses one of the problems associated with the simplified system of FIG. 1 (i.e., the problem of a variable delivery rate per unit area depending on the vehicle speed), it does not address the problem of how to handle leftover pesticide solution. If the operator could predict precisely how much pesticide solution he or she would need for a given day or run, then that amount of pesticide solution could be mixed in the tank, and there would not be a "leftover problem". Of course, it is virtually impossible to accurately predict the exact volume of pesticide solution that will be needed in the course of a day or session.

Also, with regard to both systems (i.e., the systems shown in FIGS. 1 and 2), the EPA requires that the tank and other "contaminated" components be internally washed (triple rinsed or pressure washed) at the end of the day or before switching over to another chemical; and that the rinsate from this internal washing operation be stored in a properly marked container (not the sprayer tank) or spread over a fairly large and previously untreated area. Some states, for example Michigan, are even requiring golf courses to build rinsate capturing stations in or near their equipment maintenance sheds. A station of this type includes a large drain built into the floor and special tanks for storing pesticide rinsate for proper disposal of at a later time.

In addition to the "leftover" and "internal washing" problems discussed above, Applicant believes that it would be advantageous if operators would completely clean off the exteriors of their sprayers prior to returning to the maintenance shed. The spray booms, including the manifolds and nozzles, and the vehicles themselves often become coated with the chemical solution, and these components would preferably be cleaned in the field, rather than being rinsed off next to the maintenance shed.

Thus, prior art sprayers did not adequately address the three problems discussed above: the "leftover problem," the "internal washing problem" and the "external washing problem."

SUMMARY OF THE INVENTION

Accordingly, one embodiment of the present invention is a chemical spray system including a source of pressurized water; a tank for holding concentrated chemical; means in fluid communication with the chemical tank for injecting concentrated chemical into the pressurized water source to form a chemical solution; means for spraying the chemical solution in a desired manner; means in selective fluid communication with the source of pressurized water for rinsing the chemical tank, thereby forming a rinsate solution within the chemical tank; and means in selective fluid communication with the chemical tank for dispensing the rinsate solution.

In one embodiment, the "rinsate solution dispensing means" includes a rinsate pump which can be selectively connected to the chemical tank, and a flood nozzle connected to the rinsate pump outlet, whereby the rinsate solution can be dispensed over a previously untreated area through the flood nozzle.

The "rinsing means" referred to above can include a rinsing nozzle located within the chemical tank.

The "source of pressurized water" can include a water tank and a spray pump with the outlet of the spray pump being selectively connected to either the "spraying means," to accommodate normal chemical solution spraying, or to the rinsing nozzle, to accommodate internal rinsing of the chemical tank.

The "injecting means" preferably includes an injection pump in selective fluid communication with the chemical tank, and a mixer in fluid communication with the outlet of the injection pump and in selective fluid communication with the outlet of the spray pump.

The "spraying means" preferably includes at least one manifold carrying a plurality of spray nozzles, and at least one on/off valve connected between the mixer and the corresponding manifold.

Finally, the system preferably includes a spray gun in selective fluid communication with the outlet of the spray pump, whereby the system can be externally cleaned as well.

The "chemical" referred to above would preferably be a pesticide, e.g., insecticide, herbicide, fungicide, nematicide, etc.

BRIEF DESCRIPTION OF THE DRAWINGS

The invention will be further described with reference to the appended Drawings, wherein.

DETAILED DESCRIPTION OF THE PREFERRED EMBODIMENT

Figure 3:
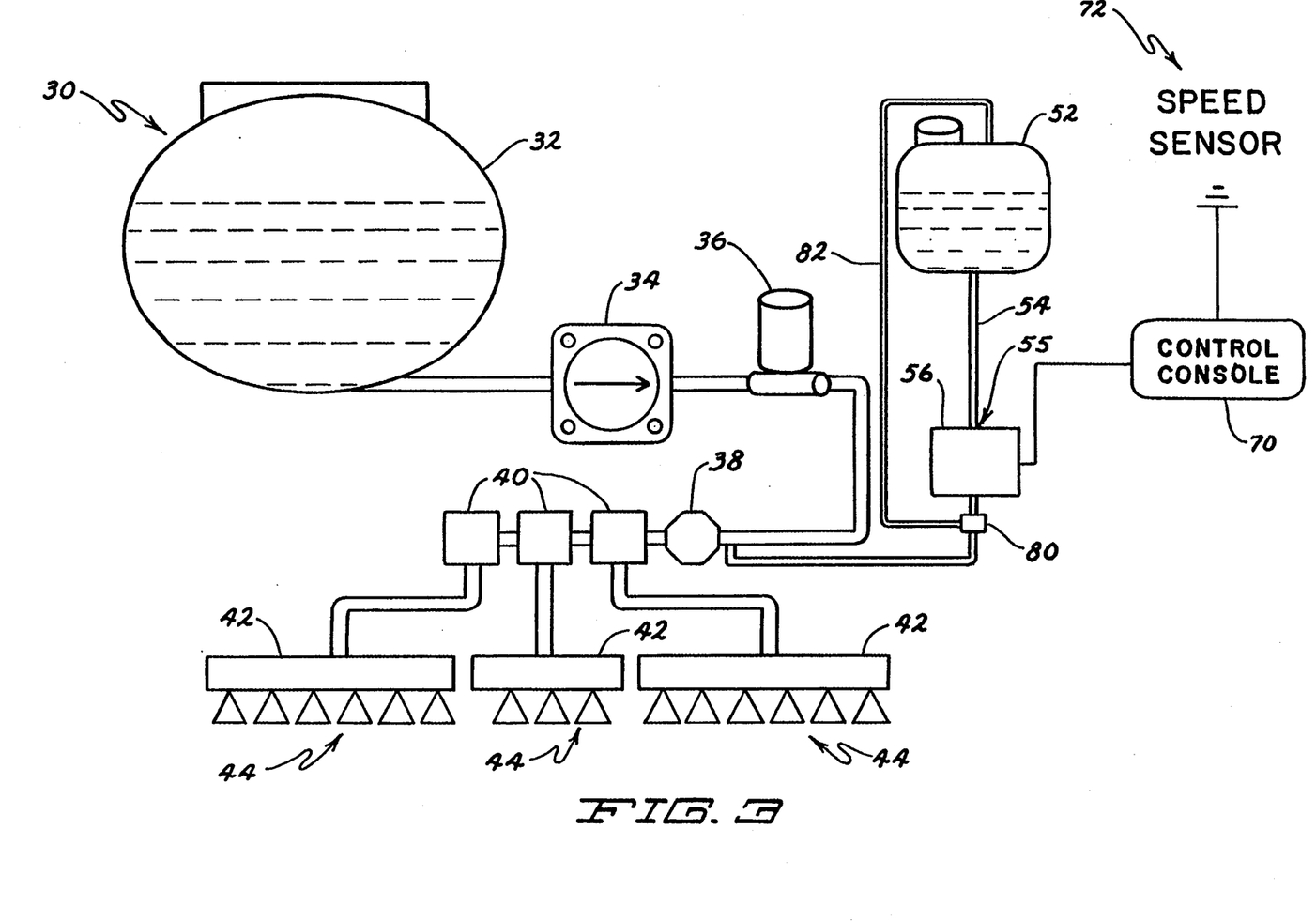
FIG. 3 is a schematic of the spray system of the present invention, in its normal operating mode.

FIG. 3 schematically shows the preferred chemical application system 30, in its normal operating mode. While such a system could certainly be used to apply a wide variety of chemicals, the invention will be described in terms of applying a pesticide. System 30 includes a clean water tank 32 which can be on the order of 110 gallons in capacity. Tank 32 can be filled/refilled anywhere there is clean water. Connected to water tank 32 is a standard centrifugal spray pump 34. Such a pump can be purchased off the shelf from a variety of manufacturers. One type of suitable spray pump is the model EC-55 pump manufactured by Memphis Pump & Manufacturing Co., Inc. This pump provides 23 to 55 gpm (at 80 to 65 psi) at 1.0 S.C., with a maximum shut-off pressure of 110 psi at 4200 RPM. The pressure side of pump 34 is connected to a pressure control valve 36. The primary function of pressure control valve 36 is to provide a substantially constant pressure source of clean water to the remainder of spray system 30. A suitable pressure control valve 36 is sold by Raven Industries, Inc., Sioux Falls, S. Dak., as part of their Raven SCS 500 Sprayer Control System, and bears Part No. 063-0159-001. This preferred valve is a ¾ inch nylon butterfly valve, although alternative valves could certainly be used. The outlet of pressure control valve 36 is in turn connected to an in-line mixer 38, which effectively blends the water and concentrated chemicals to form a homogeneous solution. Mixer 38 is preferably a conventional in-line chemical mixer such as that manufactured by Raven Industries, Inc. and offered for use as a component of an injection spraying system. The outlet of mixer 38 is connected to a bank of electrical solenoid operated on/off valves 40, each of which is connected to an independent manifold 42 carrying a bank of spray nozzles 44. Solenoid-operated valves 40 are simple on/off valves which can be selectively turned on and off by the operator or by an electronic controller 70. In fact, many of the components of system 30 can be independently controlled by the operator inasmuch as the components are preferably connected to the controller 70 conveniently located in or near the vehicle cab. Although all of these electrical connections are not shown in the drawings, those skilled in the art will recognize their utility and the manner in which they are made.

Manifolds 42 are preferably 1 inch O.D. with a 14 GA. wall, and can be purchased from Tubetech, Inc. Nozzles 44 are preferably of the ¼ inch wide angle (120°), hollow cone type, and are offered by Delevan-Delta, Inc., Lexington, Tenn. under model number RA-10.

Figure 4:
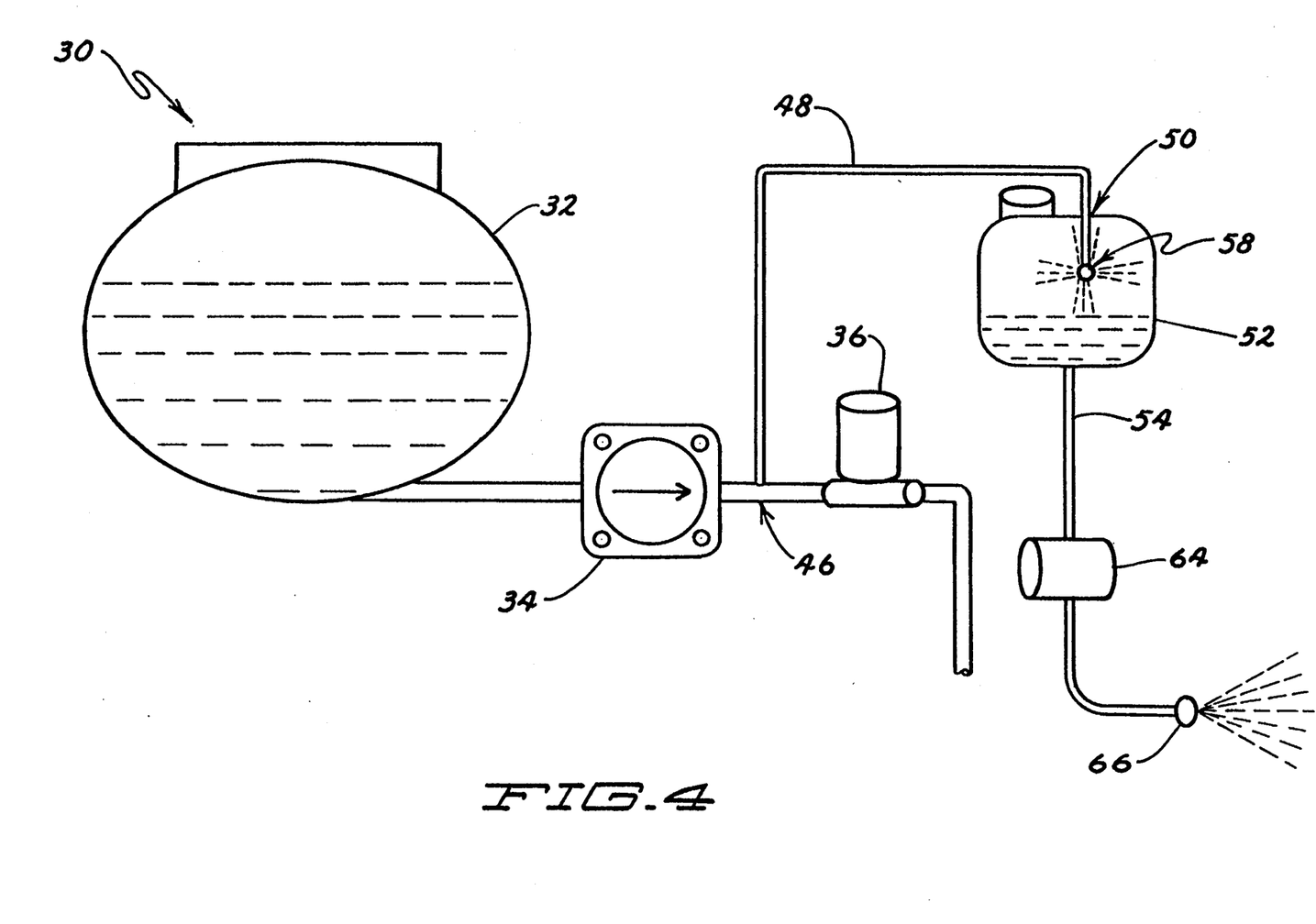
FIG. 4 is a schematic of the spray system of the present invention, in its injection tank rinsing mode.
Figure 5:
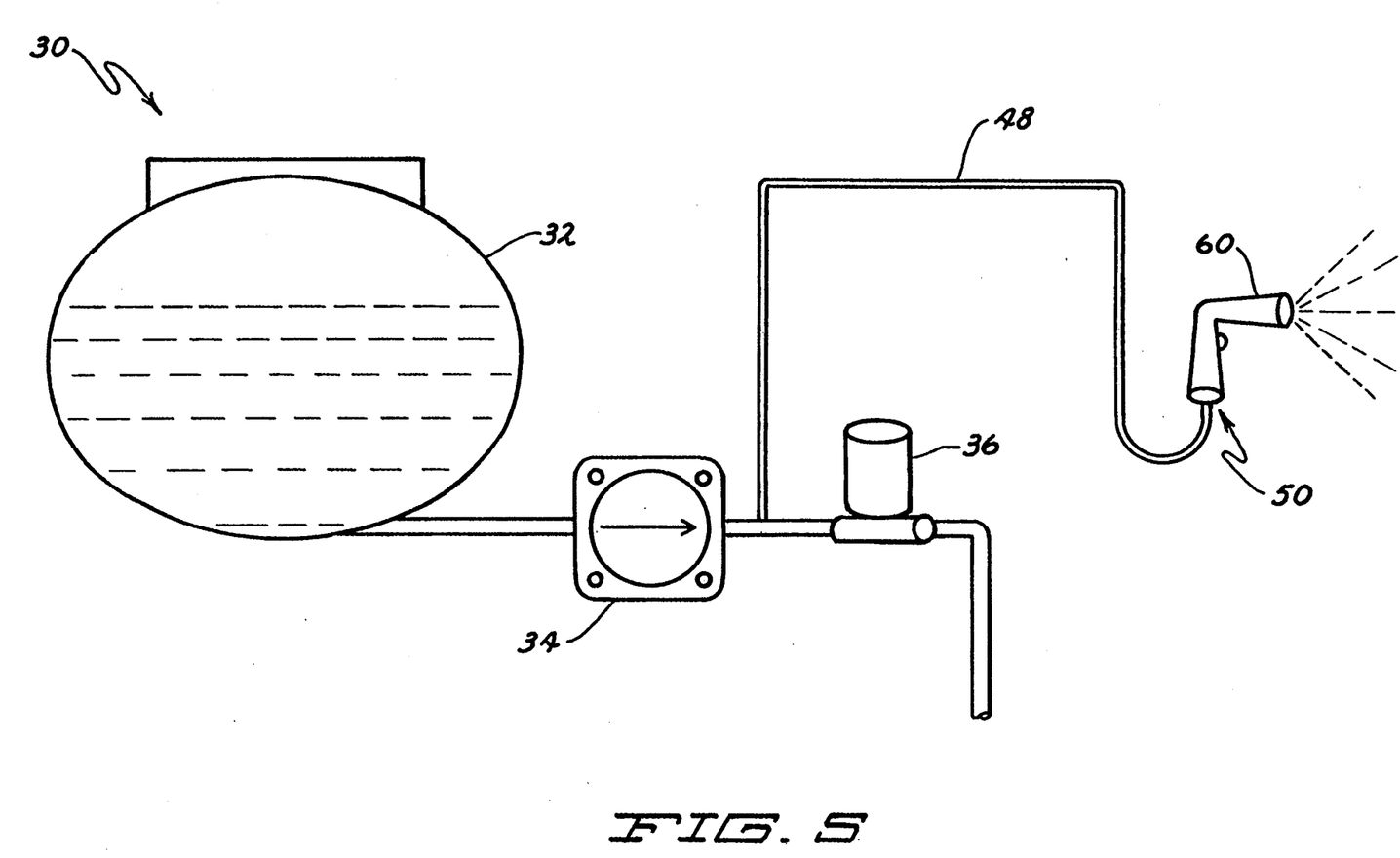
FIG. 5 is a schematic of the spray system of the present invention, in its external rinsing mode.

Referring to FIGS. 4 and 5, the tube or line running from centrifugal spray pump 34 to pressure control valve 36 carries a "T" fitting 46 to which is connected a hose 48 having a quick-connect fitting 50 at its far end. The purpose of hose 48 is described further below.

Referring to FIG. 3, concentrated pesticide, either liquid or dry, is contained within a relatively smaller tank 52. Tank 52 would preferably be stainless steel and would be about 8 gallons in capacity. Such a tank can be purchased from Raven Industries, Inc. If the concentrated pesticide is in dry, granular form, the dry pesticide is mixed with water in tank 52 to create a slurry. An agitator keeps the slurry in suspension during the injection process. The outlet of pesticide tank 52 is connected by means of a line 54 to a stainless steel positive displacement injection pump 56. While other types of chemical pumps could be used, e.g., a peristaltic pump, it is believed that a positive displacement pump is preferred since otherwise changes in the flow characteristics of the concentrated pesticide such as changes in the viscosity due to temperature fluctuations, could detrimentally impact the accuracy with which the pesticide is delivered. The outlet of injection pump 56 is connected just upstream of mixer 38, i.e., between pressure control valve 36 and mixer 38. The injection point is on the pressure side of the spray system, as close as possible to manifolds 42 and nozzles 44, to minimize the number of system components exposed to the pesticide and to reduce the lag time in the system, i.e., the time it takes a change in the flow of concentrated pesticide (via injection pump 56) to be reflected in the flow of solution through nozzles 44.

System 30 also preferably includes a 3-way valve 80 connected to the outlet of injection pump 56. Valve 80 directs the outflow from pump 56 either to a "T" located just upstream of mixer 38 or through a self-test/calibration line 82. In the self-test mode, line 82 is connected to tank 52, such that the concentrated chemical is simply recirculated. This permits the operator to check the operation of the injection pump 56 without having to actually run the vehicle. In the calibration mode, line 82 is disconnected from tank 52, and the flow through line 82 is collected in a calibrated flask. The volume so collected is then compared to the volume indicated on a gauge or readout on console 70, to check the accuracy of the injection system.

Water hose 48 can be connected to either a 240° cleaning nozzle 58 mounted in the top of pesticide tank 52; or to a "hand gun" 60. See FIGS. 4 and 5, respectively. Cleaning nozzle 58 can be a standard ball type tank cleaning nozzle providing a 240° high pressure spray pattern. The primary purpose or function of nozzle 58 is to rinse the inside of tank 52 once the concentrated product has been fully dispensed. A preferred nozzle 58 has the following specifications: fixed spray head, 240° spray angle, 40 orifices, nylon, 1.2 to 37 GPM at 40 psi, with a recommended operating pressure of 30 to 60 psi. Such a nozzle can be purchased from Spraying Systems Co., Wheaton, Ill., under model number VSM-28.

As noted above, water hose 48 can be connected to a fitting located at the top of pesticide tank 52; or alternatively, to "hand gun" 60 (see FIG. 5). The quick-connect fitting 50 on hose 48 immediately permits the flow of water through hose 48 and cleaning nozzle 58 upon connection of fitting 50 to cleaning nozzle 58 (see FIG. 4). If hose 48 is alternatively connected to "hand gun" 60, the latter includes its own on/off trigger or valve, for activation by the operator during an external cleaning operation, as described further below.

Referring to FIG. 4, hose 54 can alternatively be connected to a rinsate pump 64. Rinsate pump 64 is preferably a positive displacement pump, but it needn't be a high precision positive displacement pump like injection pump 56. A preferred rinsate pump 64 is an electrically powered positive displacement 3 chamber diaphragm pump having a check valve to prevent reverse flow and providing 3 to 1.9 GPM at 0 to 50 psi, respectively. Such a pump can be purchased from Shurflo under Model Number 2088-343-135. The outlet of rinsate pump 64 is connected to a flood spray nozzle 66 mounted on the vehicle and directed downwardly and outwardly toward the ground. Flood nozzle 66 is preferably a wide-angle, broadcast flat spray nozzle such as Model Number 36160-1 from Delevan-Delta, Inc., Lexington, Tenn.

The operation of system 30 can now be described. In order to apply a pesticide, system 30 is configured as shown in FIG. 3. It is first necessary to fill tank 32 with clean water and tank 52 with a concentrated pesticide product, either liquid or dry. As described above, if the concentrated pesticide is dry, it is also necessary for the operator to add the appropriate amount of water to tank 52 and activate an agitator (not shown). The operator then activates spray pump 34 and injection pump 56. The components of spray system 30 are, as partly shown in FIG. 3, connected to the control console 70. In a preferred system, the operator simply chooses the appropriate application rate (ounces per acre or ounces per 1,000 square feet) and inputs this preferred setting on the console 70. Console 70 then appropriately controls injection pump 56 such that it delivers the pesticide at the preselected rate, taking into account the speed of the vehicle. It should be noted that there could be multiple injection pumps 56, each with its own tank, so that different pesticides could be applied, for example, to different parts of the golf course. The operator could then easily switch back and forth from one pesticide to another as the need arises, by means of switches or the like on console 70. The concentrated pesticide, liquid or dry, is thoroughly mixed with clean water in mixer 38 and the resulting solution is applied by means of valves 40, manifolds 42 and nozzles 44. Valves 40 can typically be independently operated so that any combination of spray booms can be used at any given time.

It should be noted that water is pumped at substantially a constant rate by spray pump 34 in combination with pressure control valve 36; however, when the vehicle changes speed, this information is sensed (by a speed sensor 72 connected to console 70) and control console 70 appropriately changes the pumping rate of injection pump 56 to maintain a constant application rate of pesticide. That is, if the vehicle slows down, the water pumping rate remains relatively constant and the pesticide concentrate delivery rate goes down proportionally. Similarly, if the vehicle speed increases, the delivery rate of the pesticide increases. Obviously, the idea is to maintain a constant rate of application per unit area.

After the pesticide(s) have been applied, the self-cleansing pressure washing system can be utilized. FIG. 4 shows system 30 in its internal cleaning configuration or mode, whereas FIG. 5 shows system 30 in its external cleaning configuration or mode. To put system 30 into the configuration of FIG. 4 simply involves connecting water hose 48 to rinse nozzle 58 and activating spray pump 34. This causes high pressure clean water to completely rinse the inside surfaces of tank 52. During this time, injection pump 56 is turned off. Once the pesticide tank has been pressure washed, a rinsate application system can be engaged to apply the rinsate to the turf. This involves disconnecting hose 54 from injection pump 56 and instead connecting it to rinsate pump 64. Once pump 64 is activated, the rinsate can be advantageously spread over a fairly extensive, previously untreated area. The advantage of such a rinsate distribution technique is apparent: it is preferable from an environmental standpoint to distribute the rinsate over a wide, previously untreated area as opposed to "dumping" the rinsate in a localized area. As noted above, the EPA has regulations on disposing of rinsate and the self-cleansing pressure washing system described above can permit operators to much more easily meet the requirements or regulations of the EPA. This tank rinsing cycle can be repeated multiple times, perhaps three times, to ensure complete rinsing of tank 52, although triple rinsing may be unnecessary if the rinse is of sufficient pressure and duration.

The next step in the "internal cleaning" process shown in FIG. 4 is to inject clean water into the injection system to internally cleanse all the pesticide from the components downstream of tank 52. This involves connecting hose 48 to tank 52 and filing it with clean water, and then reconnecting hose 54 to injection pump 56. There are approximately 3 ounces of concentrated pesticide in the system from injection pump 56 to mixer 38. A simple formula tells the operator what distance he needs to drive the vehicle in order to completely flush the system of the 3 ounces. A distance monitor located on control console 70 informs the operator of the distance travelled so that every ounce of pesticide can be used and so that the entire system can be self-cleansed well away from the maintenance area.

The last step in a preferred cleaning operation is the "external cleaning" process, the configuration for which is shown in FIG. 5. This involves attaching "hand gun" 60 to hose 48 and spraying down the exterior of the sprayer. The liquid spray sometimes splashes up onto the manifolds 42 and nozzles 44, in particular. Through use of the present invention, in its external cleaning mode, these components can be sprayed down with high pressure clean water, and this would be the final step in a comprehensive cleaning procedure. All of these steps can and probably should be taken by the operator prior to returning the spray vehicle to the maintenance area or shed. Thus, there is no need to repeatedly "dump" rinsate in a localized area near the maintenance shed, nor is there any need to construct a special purpose pesticide "dumping station" in the maintenance area.

It should particularly be noted that system 30 is shown in three separate figures (FIGS. 3,4 and 5) simply for the sake of clarity. The most preferred system would incorporate all of the components shown schematically in FIGS. 3, 4 and 5, to provide normal injection spraying, internal component cleaning and external component cleaning.

Of course, there are alternative ways to interconnect the various components described above, and it's not necessary to use the specific hoses, fittings, etc., described herein. For example, there certainly could be a system whereby a three-way valve is connected to the spray pump 34 whereby clean water can be directed either to pressure control valve 36 or to the self-cleansing pressure washing system, since there is no need to have water pumping through the main spray system at the same time the concentrated pesticide tank 52 is being rinsed. That is to say, there are many ways to place the desired components in "fluid communication" (i.e., connected together in such a way that fluid pressure and/or flow are/is accommodated) at the desired time, and the present invention is in no way limited to the specific valves, fittings, nozzles, etc. described herein. A three-way valve could also be connected to the outlet of tank 52 so that it could be easily connected to injection pump 56 or rinsate pump 64 without having to connect and disconnect hoses as described above. Also, as noted above, there could be multiple pesticide tanks 52 connected to multiple or perhaps even a single injection pump 56. In the event that multiple pesticide tanks are used, each such tank could include a rinse nozzle 58, and the tanks could be pressure cleaned one at a time or all at the same time, depending on how the system is plumbed.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the apparatus and method recited in the following claims, and equivalents thereof.

I claim:

1. A chemical spray system comprising:
   (a) a source of pressurized water;
   (b) a tank for holding concentrated chemical;
   (c) means in fluid communication with the chemical tank for injecting concentrated chemical into the pressurized water source to form a chemical solution;
   (d) means for spraying the chemical solution in a desired manner;
   (e) means in selective fluid communication with the source of pressurized water for rinsing the chemical tank, thereby forming a rinsate solution within the chemical tank; and
   (f) means in selective fluid communication with the chemical tank for dispensing the rinsate solution.

2. The chemical spray system of claim 1, wherein the rinsate solution dispensing means comprises (i) a rinsate pump having an inlet and an outlet, wherein the rinsate pump inlet can be selectively placed in fluid communication with the chemical tank, and (ii) a rinsate nozzle in fluid communication with the rinsate pump outlet, whereby the rinsate solution can be dispensed over a previously untreated area through the rinsate nozzle.

3. The chemical spray system of claim 1, wherein the rinsing means comprises a rinsing nozzle located within the chemical tank.

4. The chemical spray system of claim 3, wherein (i) the source of pressurized water comprises a water tank and a spray pump having an inlet and an outlet, and (ii) the inlet of the spray pump is in fluid communication with the water tank and the outlet of the spray pump is in selective fluid communication with either the spraying means, to accommodate normal spraying of the chemical solution, or the rinsing nozzle, to accommodate rinsing of the chemical tank.

5. The chemical spray system of claim 4, wherein the injecting means comprises an (i) injection pump having an inlet and an outlet, wherein the inlet of the injection pump can be selectively placed in fluid communication with the chemical tank, and (ii) a mixer having an inlet and an outlet, wherein the inlet of the mixer is in fluid communication with the outlet of the injection pump and in selective fluid communication with the outlet of the spray pump.

6. The chemical spray system of claim 5, wherein the spraying means comprises (i) a manifold carrying a plurality of spray nozzles, and (ii) an on/off valve connected between the mixer and the manifold.

7. The chemical spray system of claim 4, further comprising a spray gun in selective fluid communication with the outlet of the spray pump, whereby the system can be externally cleaned.

8. The chemical spray system of claim 1, wherein chemical is a pesticide.

9. A chemical spray system comprising:
   (a) a source of pressurized water;
   (b) a tank for holding concentrated chemical;
   (c) an injection device having an inlet and an outlet, wherein the injection device inlet is in fluid communication with the chemical tank;
   (d) a mixing device having an inlet and an outlet, wherein the injection device outlet and the pressurized water source are in fluid communication with the mixing device inlet, and wherein the water and concentrated chemical combine to form a chemical solution in the mixing device;

(e) a nozzle for spraying the chemical solution in a desired manner in fluid communication with the outlet of the mixing device;

(f) a rinsing nozzle located within the chemical tank in selective fluid communication with the pressurized water source, for rinsing the chemical tank, thereby forming a rinsate solution within the chemical tank; and (g) a rinsate spray nozzle in selective fluid communication with the chemical tank for dispensing the rinsate solution.

10. The chemical spray system of claim 9, further comprising a rinsate pump having an inlet and an outlet, wherein the rinsate pump inlet can be selectively placed in fluid communication with the chemical tank, and the rinsate spray nozzle is in fluid communication with the rinsate pump outlet, whereby the rinsate solution can be dispensed over a previously untreated area through the rinsate nozzle.

11. The chemical spray system of claim 9, wherein (i) the source of pressurized water comprises a water tank and a spray pump having an inlet and an outlet, and (ii) the inlet of the spray pump is in fluid communication with the water tank and the outlet of the spray pump is in selective fluid communication with either the inlet of the mixing device, to accommodate normal spraying of the chemical solution, or the rinsing nozzle, to accommodate rinsing of the chemical tank.

12. The chemical spray system of claim 11, further comprising a spray gun in selective fluid communication with the outlet of the spray pump, whereby the system can be externally cleaned.

13. The chemical spray system of claim 11, wherein the pressurized water source further comprises a pressure control valve having a valve inlet connected to the spray pump outlet and a valve outlet connected to the mixing device inlet.

14. The chemical spray system of claim 9, further comprising (i) a manifold carrying a plurality of spray nozzles, and (ii) an on/off valve connected between the mixing device and the manifold.

15. The chemical spray system of claim 9, wherein the chemical is a pesticide.

16. The chemical spray system of claim 9, wherein the injection device inlet is connected directly to the chemical tank by means of a hose.

17. The chemical spray system of claim 9, wherein the injection device comprises an injection pump.

18. The chemical spray system of claim 9, wherein the injection device outlet and the pressurized water source are connected directly to the mixing device inlet.

19. The chemical spray system of claim 9, wherein the mixing device comprises an in-line chemical mixer.

20. The chemical spray system of claim 9, wherein (i) the system is suitable for mounting on a spray vehicle having a variable speed; (ii) the system further comprises a speed sensor tier sensing the vehicle speed and a control device connected to the speed sensor and to the injection device; and (iii) the control device controls the injection device depending on the speed of the vehicle to deliver the chemical at a preselected rate.

* * * * *